June 1, 1965   H. J. GRIEB   3,186,166
GAS TURBINE DRIVE UNIT
Filed Nov. 20, 1959   3 Sheets-Sheet 1
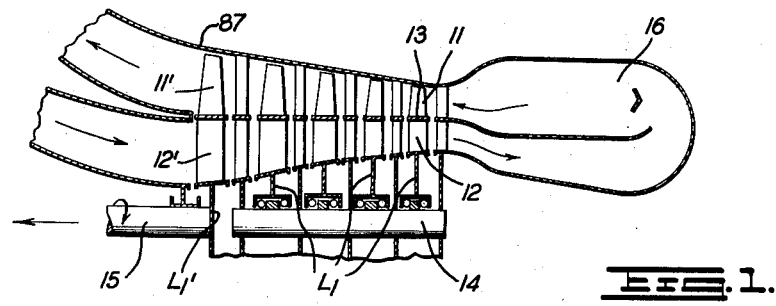
FIG. 1.
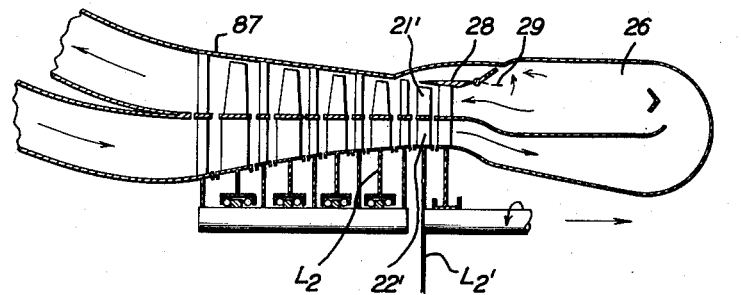
FIG. 2.
FIG. 6.
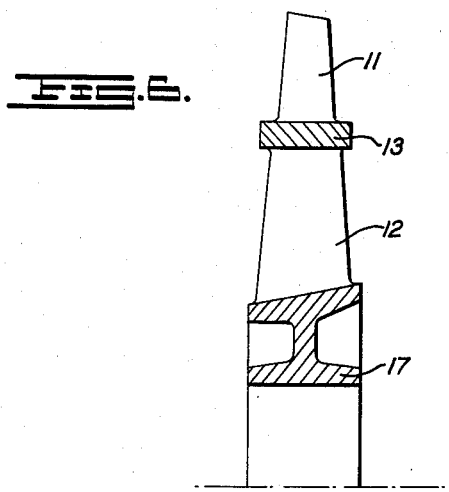
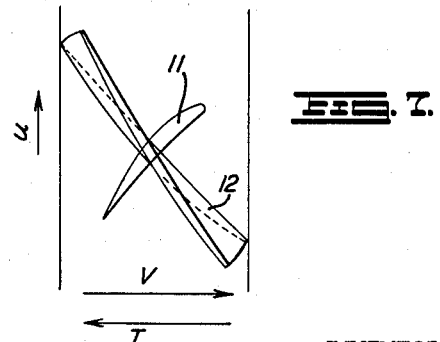
FIG. 7.
INVENTOR
HUBERT J. GRIEB
BY
ATTORNEY

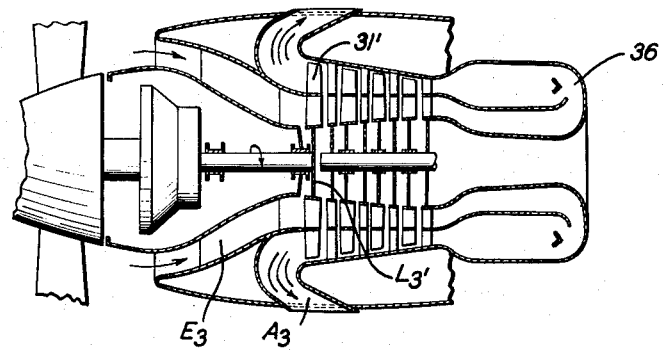
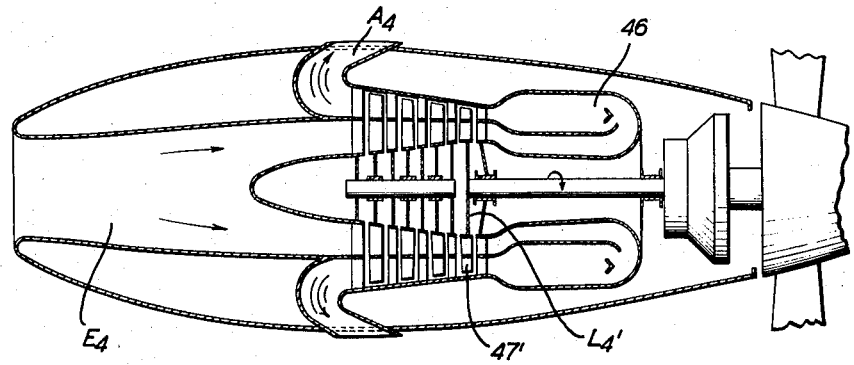
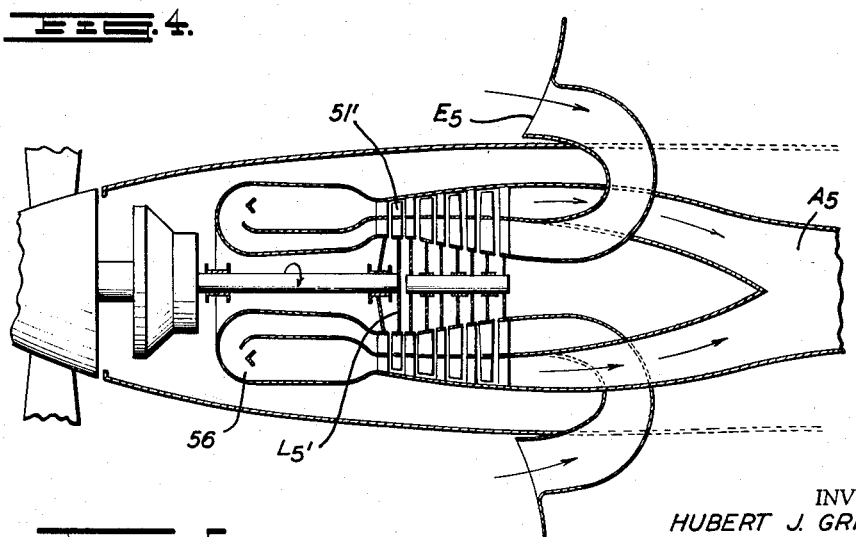

June 1, 1965  H. J. GRIEB  3,186,166
GAS TURBINE DRIVE UNIT
Filed Nov. 20, 1959  3 Sheets-Sheet 3
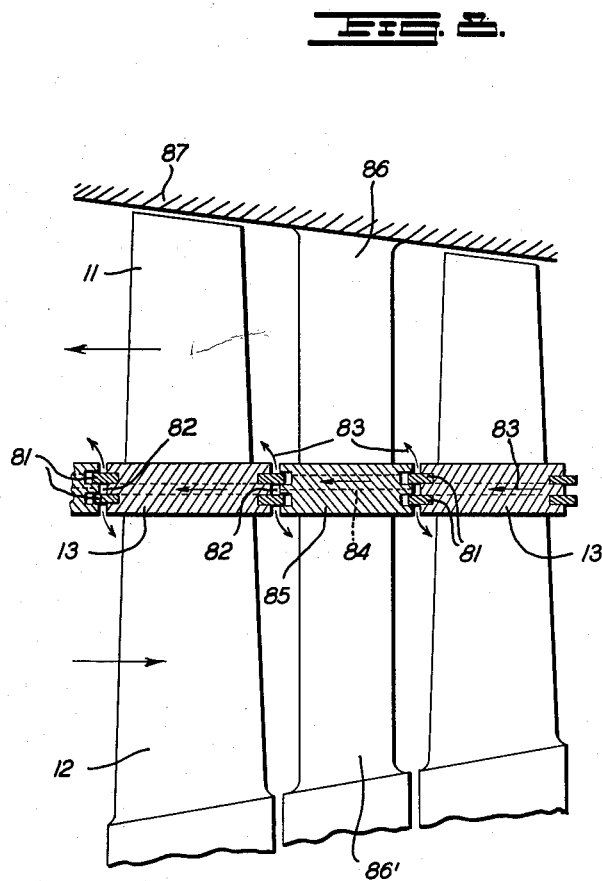
INVENTOR
HUBERT J. GRIEB
BY *Dicke, Craig & Freudenberg*
ATTORNEY

United States Patent Office 3,186,166
Patented June 1, 1965

3,186,166
GAS TURBINE DRIVE UNIT
Hubert J. Grieb, Stuttgart-Stammheim, Germany, assignor to Daimler-Benz Aktiengesellschaft, Stuttgart-Untertürkheim, Germany
Filed Nov. 20, 1959, Ser. No. 854,429
Claims priority, application Germany, Nov. 26, 1958, D 29,450
7 Claims. (Cl. 60—39.16)

The present invention relates to a gas turbine power plant or propulsion unit consisting principally of a compressor, of one or several combusion chambers, of a compressor-drive-turbine and possibly of a work or output turbine provided with a mechanical output, for example, for driving a propeller or propellers.

Gas turbine drive units known in the prior art which include the principal component parts mentioned hereinabove normally are of the following construction:

The individual combustion chambers are arranged between a compressor disposed in the forward portion of the unit and the compressor-drive-turbine driving the compressor which are rigidly connected with each other by means of a hollow shaft extending in the axial direction. These aforementioned parts form the combustion gas producing section. The output or work-turbine which is utilized in connection with the mechanical output load driven thereby and which is normally separated mechanically from the compressor-drive-turbine is thereby arranged to the rear of or behind the compressor-drive-turbine. With turbo-propeller drive units or systems, the drive of the propellers which, for the most part, are arranged at the front end of the drive unit, takes place by means of the output or work-turbine which drives the propeller by means of a shaft extending through the aforementioned hollow shaft over a change-speed reduction gear disposed ahead of the compressor. This known construction which is already in use in various modifications and differing embodiments, however, entails the disadvantage that a relatively lengthy structure results by the series arrangement of the individual principal component parts disposed seriatim which is disadvantageous in connection with the installation of such drive units in vehicles, especially in airplanes with respect to the required volume and weight thereof; additionally such prior art drive units also produce considerably unfavorable effects with respect to the extent and dimension as well as weight of the airplane cell or nacelle. Furthermore, the shaft transmitting the output torque which is disposed between the output turbine and the change-speed gear entails definite disadvantages because, by reason of the relatively long dimension thereof, it renders more difficult the control of the critical r.p.m.'s and also offers thereby difficulties to the bearing support of the shaft disposed on the outside thereof.

In addition to this classic prior art form of a gas-turbine drive-units or system (PTL-construction), so-called two-cycle gas-turbine drive-units (TL-construction) are known in which a free-running turbine-blower wheel is arranged behind the main drive unit of any suitable construction and consisting of compressor, of combustion chambers, and of compressor-drive-turbine which are disposed one behind the other in the axial direction whereby the free-running turbine-blower wheel consists of an inwardly disposed turbine blading located within the flow path of the combustion gases of the main drive unit and of an outer compressor blading which supplies atmospheric air and effectively places around the hot combustion gas stream of the main drive unit a cold-air coat for the purpose of increasing the starting thrust of the drive unit and to obtain a fuel economy which is achieved by a sustained and intense increase in the rate of air flow through the entire drive unit with a simultaneous decrease of the average or mean discharge flow velocity.

The present invention is concerned with the task and problem of creating a new concept of a gas turbine drive unit which obviates the disadvantages accompanying the gas turbine drive units of known construction and which in addition to a compact construction entails advantages with respect to the aerodynamic control of the over-all turbo-operation.

The present invention proposes as a solution to this problem to arrange the compressor and turbine or turbines coaxially one about the other, i.e., in nested relationship and to effectively and operatively connect the same with each other whereby the compressor is traversed by the combustion air intended for the cycle consisting of compressor-combustion chamber-turbine in one direction whereas the turbine is traversed by the combustion gases leaving the combustion chamber or chambers in a direction opposite to the first-mentioned direction.

According to another feature of the present invention, it is proposed to arrange the blading of the individual compressor or turbine stages, as viewed in the radial direction thereof, one behind the other in a manner known per se and to operatively connect both groups of blading with each other by means of an intermediate section, preferably by means of a blade rim or intermediate section disposed therebetween.

In contrast to the constructions of the prior art described hereinabove according to which, with a turbine-blower wheel separated mechanically from the main drive unit, the turbine blading is disposed inwardly thereof and the compressor blading outwardly thereof, an arrangement is preferred in accordance with the present invention in particular in which the turbine or turbine blading is disposed radially outwardly with respect to the individual stages thereof and the compressor or compressor blading is disposed radially inwardly.

Furthermore, it is proposed in accordance with the present invention to construct and install the runner wheels of the individual stages consisting primarily of compressor blading, on the one hand, and turbine blading, on the other, in such a manner that they are not mechanically linked or coupled with each other.

Accordingly, it is an object of the present invention to provide a gas turbine drive unit which obviates the disadvantages and shortcomings of the prior art constructions.

It is another object of the present invention to provide a gas turbine drive unit which is very compact and requires relatively little space.

Still another object of the present invention resides in the provision of a gas turbine turbo-propeller drive unit, particularly for airplanes, which reduces effectively the requirements for space and weight within the airplane to a considerable extent.

Still another object of the present invention resides in the provision of a gas turbine drive unit, particularly for driving propeller driven airplanes in which relatively long shafts or mechanical connections are eliminated and in which, additionally, the critical rotational speeds of the shafts may be readily controlled in an advantageous manner.

A still further object of the present invention resides in the provision of a gas turbine unit arrangement which is particularly suitable and efficient for use with a transsonic or supersonic compressor.

A further object of the present invention resides in the provision of a gas turbine drive unit which may be readily adapted for use with heat exchangers, particularly in case of use with atomic reactors.

These and other objects, features and advantages of the present invention as well as different application possibilities thereof to vehicles, especially airplanes, will become more obvious from the following description when taken in connection with the accompanying drawing which shows, for purposes of illustration only, several embodiments in accordance with the present invention and wherein:

FIGURE 1 is a schematic, partial, longitudinal cross-sectional view through one half of a gas turbine drive unit in accordance with the present invention provided with combustion gas producing means and with a work or output-turbine arranged at a low pressure side of the system.

FIGURE 2 is a schematic, partial, longitudinal cross-sectional view of a modified embodiment of one half of a gas turbine drive unit in accordance with the present invention provided with combustion gas producing means and with an output turbine arranged at the high pressure side of the system.

FIGURES 3 to 5 are schematic longitudinal cross-sectional views through three embodiments illustrating different possibilities of installation of a gas-turbine drive-unit system in accordance with the present invention in vehicles, particularly propeller-driven airplanes.

FIGURE 6 is a cross-sectional view through one half of a runner wheel in longitudinal cross-section in which the bearing support thereof is omitted for sake of clarity.

FIGURE 7 is a diagrammatic showing illustrating in the plan view the compressor and turbine blading of a runner wheel in accordance with the present invention, and FIGURE 8 is a partial longitudinal cross-sectional view, on an enlarged scale, through a compressor-turbine blading arrangement according to the present invention provided with an output turbine arranged at the low pressure side of the system and with guide means for conducting cooling air.

Some of the advantages inherent in the present invention, particularly with the use of supersonic compressors, will be described more fully hereinafter, following the description of the several views illustrating the several specific embodiments in accordance with the present invention.

Referring now to the drawing wherein like reference numerals are used throughout the various views to designate corresponding parts, and more particularly to FIGURE 1, the individual runner wheels illustrated therein include a radially outwardly disposed turbine blading 11, a radially inwardly disposed compressor blading 12, and and intermediate section 13 operatively connecting the two bladings 11 and 12. The individual runner wheels $L_1$ which are freely rotatably supported independently of each other on a stationary shaft 14 secured to the housing of the turbine in any suitable manner form part of the combustion gas producer means whereas the runner wheel $L_{1'}$ is operatively connected for common rotation with the output shaft 15. The compressor is preferably constructed in an advantageous manner as contra-rotating supersonic compressor for reasons which will be explained more fully hereinafter. The work or output turbine 11' is arranged in the embodiment of FIGURE 1 at the low pressure side of the system whereby the compressor stage 12' coordinated thereto operates preferably as rotatable input guide means for the compressor. Reference numeral 16 designates the combustion chamber which may be of any known conventional construction.

In connection with the drive unit illustrated in FIGURE 2, the output turbine 21' is arranged on the runner wheel $L_{2'}$ disposed at the high pressure side of the system. Runner wheel $L_{2'}$ also includes a compressor blade 22'. A bypass line 28 operatively connects thereby the exit or outlet of the combustion chamber 26 with the first turbine-compressor stage $L_2$ adjacent the combustion chamber 26. The quantity of the combustion gases flowing through the bypass line 28 may be suitably controlled and adjusted by a control member 29 of any suitable construction in the sense that a part of the entire combustion gas quantity follows a path during the acceleration of the drive unit through the bypass line 28 in order to enable increase of the rotational speed of the gas producer means as quickly as possible.

FIGURE 3 illustrates the installation of a gas turbine drive unit of the type illustrated in FIGURE 1 into a vehicle, especially into an airplane. The inlet $E_3$ for the admission of combustion air is thereby arranged at the forward end of the drive unit. The combustion chamber or chambers 36 are located at the rear end of the drive unit. The propeller arranged at the front end of the drive unit is driven thereby by the output turbine 31' arranged on the runner wheel $L_{3'}$ which is located at the low pressure side of the system. The outlet or discharge of the combustion gases from the drive unit takes place laterally under an inclination toward the rear at $A_3$.

According to the embodiment of FIGURE 4, the admission of the combustion air into the compressor takes place centrally in front thereof at $E_4$. In the embodiment of FIGURE 4 there is provided as output turbine a turbine 47' arranged at the high pressure side of the system which is disposed on the runner wheel $L_{4'}$ and which drives the propeller disposed at the rear end of the drive unit. The outlet or discharge $A_4$ for the combustion gases from the drive unit is again disposed laterally at the drive unit. The combustion chamber or chambers 46 of any suitable construction again are disposed behind the compressor-turbo portion.

FIGURE 5 illustrates still another modified embodiment in accordance with the present invention in which the air inlet $E_5$ is disposed laterally at the drive unit. A high-pressure turbine 51' disposed on the runner wheel $L_{5'}$ thereby drives the propeller disposed in front of the drive unit. The combustion chamber or chambers 56 are arranged ahead of the compressor turbine group. The discharge or outlet $A_5$ of the combustion gases from the drive unit is located centrally toward the rear.

In each of the embodiments of FIGURES 3–5 turbine output shaft drives the propeller over a suitable change-speed gear of any known construction as is conventional. Additionally, the propellers may be arranged so as to form part of a helicopter or the like.

The longitudinal cross-section through one half of a runner wheel illustrated in FIGURE 6 in which the bearing of the runner wheel is omitted for clarity's sake, shows a compressor blade 12, a rim portion or intermediate section 13 and a turbine blade 11. Reference numeral 17 designates in FIGURE 6 the base of hub portion of the blade.

In the diagrammatic view of FIGURE 7, reference numeral 11 designates a turbine blade and reference numeral 12 a compressor blade. The common directional rotation is indicated by the arrow U whereas the air flowing through the compressor is indicated by the arrow V and the flow of the combustion gases flowing through the turbine is indicated by the arrow T.

In connection with an output turbine arranged at the high pressure side, as illustrated, for example, in FIGURE 2, a higher pressure prevails in all of the compressor stages than in the corresponding turbine stages so that the leakage quantities passing from the compressor into the turbine effectively produce a screen or layer-like cooling of the rim portions on the sides thereof facing the turbine.

In contradistinction thereto, with a construction of the output turbine arranged at the low pressure side, as illustrated, for example, in FIGURE 1, a higher pressure prevails in the turbine stages than in the respective compressor stages. In order to avoid any leakage of the hot combustion gases from the turbine into the compressor, it is proposed in accordance with the present invention to supply, as illustrated in FIGURE 8, the chambers 82 disposed between the individual seals 81 of the individual stages with compressed air indicated in FIGURE 8 by arrows 83 whereby the compressed air 83 is derived in each case from a higher compressor stage in which a higher pressure prevails so that an over-pressure is produced in each of the chambers 82 with respect to the existing pressure of the corresponding turbine stage. Such an arrangement also assures for the instant case, i.e., with the output turbine disposed at the low pressure side that leakage, if any, involves compressed air leaking from the compressor into the turbine and not vice versa which again produces a screen-like cooling of the turbine base portions. The compressed air may thereby be guided through channels 84 which extend within the runner rim portions 13 and within the intermediate sections 85 disposed between the support blades 86, 86'.

The spacings between the intermediate sections 13 of the individual gas producer stages 11, 12 have to be bridged by the stationary rim portions or intermediate sections 85 in such a manner that a continuous separating wall provided with sealed interruptions between the individual stages results therefrom between the compressor and the turbine. The seals may thereby be of any suitable known conventional construction and material. Either all or only some of the stationary intermediate sections 85 may be rigidly connected with the turbine outer wall 87 of the drive unit housing by means of support blades 86 as well as with the stationary shaft 14 securely fastened to the housing by means of support blades 86'. It is also within the purview and scope of the present invention to brace the stationary intermediate sections 85 either only by means of support blades 86 or by means of support blades 86'. However, at least one set of support blades 86 and 86' thereby have to transmit the axial thrust of the gas producer section to the housing. The support blades 86 and/or 86' are thereby constructed preferably so as to be aerodynamically ineffectual with a contra-rotating gas producer.

Many advantages may be obtained with the present invention among which only a few will be mentioned hereinafter.

As clearly illustrated in the embodiments of FIGURES 3, 4 and 5, a relatively short connection between the output turbine and the change-speed gear or the propeller is assured in each case. The structural length and the weight of the drive unit is reduced, generally speaking, by the concentric or nester arrangement of the compressor and turbine. Even though it might be assumed at first that the proposed construction of compressor and turbine would entail an increase in the overall diametric dimension of the drive unit, numerous drive units already in use which are of the known construction consisting of change-speed-gear plus air inlet, compressor, compressor-drive-turbine, output-turbine disposed one behind the other, in contrast thereto clearly prove that the largest diameter of a drive unit is determined by the change-speed gear for the propeller and by the air inlet and not by the compressor or the turbine. With the construction proposed in accordance with the present invention the outer diameter of the turbine arranged about the compressor is also smaller than the air inlet disposed about the change-speed gear; for, by reason of the particularly favorable utilization of the wheel cross-section at the low pressure side of the system, the outer diameter of the turbo portion has to be only slightly larger than in the known prior art drive units.

The construction of the compressor blading may be of any suitable known arrangement either subsonic, transsonic or supersonic. However, the maximum advantages and full benefits obtainable with the present invention are realized only with a construction of the individual stages as contra-rotating transsonic, particularly supersonic stages as will be explained more fully hereinafter. It is therefore preferable in accordance with the present invention to provide supersonic compressor stages. This is so because relatively few stages suffice for the intended purposes in order to achieve the usual pressure conditions. By reason of the exclusively aerodynamic coupling of the runner wheels of the gas producer section, the undesirable consequences of the compressibility of the air which occur in multi-stage compressors of known construction provided with mechanically coupled stages are eliminated for the most part, and the pump limit of the compressor no longer has to be taken into consideration to the same extent as in drive units with prior art compressors.

According to the present invention the individual runner wheels of the gas producer section, in contrast to the drive units of known construction, may adjust themselves, i.e., individually in an advantageous manner to optimum conditions as regards the thermodynamic and flow conditions dependent on the actual output thereof which results in an improvement of the overall efficiency over a wide operating range of the drive unit. It suffices thereby to supervise and control, in addition to the output turbine, the high-pressure-side runner wheel of the gas producer as the rotational speed thereof decreases least with a decrease in the energy supply. Furthermore, by reason of the far reaching decrease in the consideration for the pump limit of the compressor and by reason of the relatively smaller rotating masses very good accelerating times may be achieved. Additionally, a very low auto-operating point is possible so that the starting motor may be constructed correspondingly small and lightweight. The starting operation may therefore take place through the low pressure or also through the high pressure outer gas producer stage.

The at least partial elimination of the disagreeable consequences of the compressibility of the air, of course, also applies not only for the compressor but also for the turbine.

Since the individual compressor-turbine stages only have to produce the output or load required by the respective compressor stage operatively connected therewith and since additionally the principle of contra-rotating operation with its consequences is also applicable to the turbine, a turbine blading constituting a so-called reaction blading with an extremely wide positioning and a relatively slight curving of the turbine blades suffices for the arrangement of the present invention and is quite satisfactory for its intended purposes. Consequently, the loading of the intermediate sections or rim portions by the respective turbine blading is correspondingly low.

A further advantage of the present invention over the prior art gas turbine units consists in the fact that the relatively few compressor stages may be equipped with fewer blades, made however, of more sturdy construction. Consequently, the blading of the compressor is more sturdy and less sensitive to soiling than the blading of a multi-stage axial compressor.

The contra-rotatability of the runner wheels of the gas producer does not cause any difficulties with respect to runner wheels rotating in the same direction since all of the runner wheels according to the present invention are directly supported on a stationary shaft. Consequently, the cooling of the bearings becomes more simple and improved as compared to prior art drive units since the relatively cool air stream which takes place through the radially inwardly disposed compressor has an insulating effect with respect to the relatively hot radially outwardly disposed turbine.

Furthermore, mention should be made of the advantage which a combustion chamber offers disposed in front of or behind the turbo-compressor portion or section. In that case, fewer limitations are imposed on the design of the spatial configuration and shape of the combustion chamber. The combustion chamber loading may thereby be kept smaller which reduces losses and increases the stability range. Furthermore, no consideration has to be paid to the critical rotational speed of the turbo-compressor section and to the rigidity of the connection of the stationary parts of compressor and/or turbine. This is in sharp contrast to the limitations imposed by similar considerations with the prior art devices.

Moreover, considerable and additional advantages result from the arrangement of the combustion chamber in front of or behind the compressor turbine section, in principle, as, regards a gas turbine drive unit that is driven by atomic energy. In the drive units known heretofore, the atomic reactor has to be arranged laterally of the drive unit which is very disadvantageous with respect to the drive unit installation in vehicles, especially airplanes.

As mentioned hereinabove, the present invention is of particular use and advantage with supersonic compressors because the fullest extent of the advantages that may be derived therefrom is possible only with such supersonic compressors as will become more obvious from the following brief analysis of the problems arising in connection therewith.

As is known, with subsonic compressors, the relative circumferential speed of adjacent stages cannot exceed a predetermined magnitude since otherwise the critical approach-velocity Mach numbers are exceeded. It follows therefrom that with a subsonic compressor no substantial decrease in the number of stages can be achieved by the use of a contra-rotating arrangement.

In contrast thereto, with a supersonic compressor, the conditions with respect to the pressure head per stage are the more favorable the greater the relative approach-velocities so that no limits are imposed any longer for the relative circumferential speeds from the aerodynamic point of view. Only because of limitations imposed by the manufacturing reasons particularly concerning the non-availability of suitable materials, the circumferential speed at the outer diameter of a supersonic compressor should not surpass 400 meters per second in line with the present state of the technological properties of the known blading materials. If this is applied to a contra-rotating supersonic compressor, this means in practice nevertheless a relative circumferential velocity of up to 800 meters per second.

If the foregoing analysis is further pursued and if it is assumed that the circumferential velocity at the blade tips of the radially outwardly disposed turbine is approximately 400 meters per second which is feasible both from an aerodynamic and manufacturing point of view, then velocities of 280 to 320 meters per second will result for the radially inwardly disposed supersonic compressor. By the use of contra-rotating supersonic compressor stages, this corresponds to a relative circumferential velocity of the individual stages of 560 to 640 meters per second which in turn is definitely favorable. It follows from the corollary that the contra-rotating subsonic stage in which relative circumferential velocities of only 300 to 350 meters per second are admissible are definitely unfavorable and disadvantageous for the instant situation if considered from an overall point of view.

It is also known that, on the other hand, a considerably larger pressure head may be effectively handled in a runner wheel constructed as turbine than in the same runner wheel constructed as compressor. It follows therefrom that with gas turbine drive units of known construction, the subsonic compressor always has more stages than the turbine. Consequently, the use of a subsonic compressor in a drive unit having a radially outwardly disposed turbine and a compressor arranged concentrically radially inwardly with respect thereto does not entail the same advantages and fullest enjoyment of all the benefits obtainable with the present invention, from an overall point of view, since the number of stages of the drive unit would still have to be chosen in dependence on the number of stages necessary for the subsonic compressor regardless of the lesser requirement of the turbine section. Consequently, a relatively larger number of stages for the turbine is also unavoidable notwithstanding the construction in accordance with the present invention as long as a subsonic compressor is used. This remaining disadvantage which is controlling for the entire drive unit is, however, eliminated in accordance with the present invention because a contra-rotating supersonic compressor permits a reduction in the stages and thereby effectively aids the turbine of the drive unit from a numerical point of view.

Consequently, the multi-stage supersonic compressor may be utilized particularly favorable with a gas turbine drive unit according to the present invention because, by reason of the opposite loading of compressor and turbine the rotary speeds of the individual runner wheels always adjust themselves in such a manner that each compressor stage operates at a relatively favorable operating point. Consequently, the multi-stage supersonic compressor without mechanical coupling or linkages between the individual stages thereof entails particular advantages concerning the operating conditions of a drive unit according to the present invention.

It should also be noted that the starting conditions of such an arrangement become very favorable because the advantages of the exclusively aerodynamic coupling are the more prominent and significant the smaller the load on the drive unit, i.e., a very low auto-operating or self-starting point may be expected which in turn requires a relatively small starter motor.

Consequently, it becomes clear from the foregoing considerations based on the inventive concepts that the advantage of relatively short construction of the overall drive unit by reducing the number of stages together with the resulting constructional simplifications and decrease in cost becomes of particular significance by the use of a supersonic compressor which multiplies the advantages and benefits obtainable from the basic inventive concepts. For these reasons, the use of a supersonic compressor is preferred with a gas turbine drive unit according to the present invention. As shown in all of the figures of the drawing, the axial length of the compressor and turbine means, due to the before-described features, is less than the largest diameter of the portion of the turbine wall means immediately adjacent the peripheries of the turbine blades shown. Thus, these features are effective to establish a particular relationship between these dimensions.

While I have shown and described several embodiments in accordance with the present invention, it is understood that the same is not limited thereto but is susceptible of many changes and modifications within the spirit and scope of the present invention. For example, the concept of the present invention is also applicable to hot-air turbine drive units provided with either an open or closed cycle in which, in the place of the combustion chamber, a heat exchanger is provided for heating the working medium compressed prior thereto, for example, for use with gas turbine drive units provided with an atomic reactor.

Thus, it is obvious that the present invention is not limited to the particular details shown and described herein but may be modified at will within the scope of the present invention, and I, therefore, do not wish to be limited to the details shown and described herein but intend to cover such changes and modifications as are encompassed by the scope of the appended claims.

I claim:

1. A gas turbine drive unit comprising compressor means, combustion chamber means, turbine means including compressor-drive-turbine means for driving said compressor means and output turbine means mechanically separate from said first-mentioned compressor-drive-turbine means, said output turbine means including mechanical output means, said turbine means comprising blade means and wall means, said wall means comprising a portion immediately adjacent the peripheries of said blade means, means effectively establishing a relationship between the axial length of said compressor means and said turbine means and the largest diametrical distance between the peripheries of any diametrically disposed pair of blades of said blade means, in which relationship said axial length is less than said largest diametrical distance, said establishing means comprising an arrangement of said compressor means and said turbine means in which said compressor means and said turbine means are concentrically disposed in nested relationship, said establishing means further comprising a plurality of supersonic stages provided in said compressor means, means operatively connecting said compressor means and turbine means with each other, said compressor means and turbine means being so arranged that the combustion air intended for said compressor means, said combustion chamber means and said turbine means flows through the compressor means in one direction whereas the combustion gases leaving said combustion chamber means flow through said turbine means in the opposite direction, said output turbine means being located on the low pressure side of the unit, and further comprising means for producing a cooling effect for the base portions of the individual turbine stages by supplying compressed air from a higher pressure compressor stage to the connecting means of a relatively lower pressure stage.

2. A gas turbine drive unit according to claim 1, wherein said means for effectively cooling the base portions of the individual turbine stages by supplying compressed air from a relatively higher pressure compressor stage to the connecting means of a relatively lower stage includes channels provided in said connecting means, stationary connecting means intermediate the first-mentioned connecting means, channels being provided also in said stationary connecting means, and sealing means intermediate said first-mentioned connecting means and said stationary connecting means provided with chambers into which discharge said channels.

3. A gas turbine drive unit having a stationary part, comprising a supersonic compressor having a plurality of stages each provided with blade means, a turbine having a like number of stages each also provided with blade means, combustion chamber means operatively connected between said compressor and said turbine, said compressor and said turbine being arranged coaxially with respect to each other in nested relationship with the blade means of the compressor disposed radially inwardly and the blade means of the turbine radially outwardly, said turbine comprising a wall portion immediately adjacent to and surrounding the peripheries of the blade means of said turbine, the largest diameter of said immediately adjacent wall portion being of greater extent than the extent of said wall portion in the axial direction, annular support means operatively connecting the individual stages of the compressor with corresponding stages of the turbine, means individually and rotatably supporting interconnected compressor-turbine stages on said stationary part, the blade means of the turbine and compressor of said last-mentioned stages being so arranged and constructed as to provide contra-rotation between adjacent individually-supported stages, and the individually supported stages of said compressor being so arranged and constructed with said radially inwardly disposed blade means thereof as to effectively constitute a supersonic compressor.

4. A gas turbine drive unit having a stationary part, comprising an output shaft, a supersonic compressor having a plurality of stages each provided with blade means, a turbine having a like number of stages each also provided with blade means, at least one of the end stages of said turbine being connected with said output shaft, combustion chamber means operatively connected between said compressor and said turbine, means effectively minimizing the numbers of said stages of said compressor and said turbine and comprising an arrangement in which said compressor and said turbine are arranged coaxially with respect to each other in nested relationship with the blade means of the compressor disposed radially inwardly and the blade means of the turbine radially outwardly, said blade means of said compressor and turbine extending in the axial direction a lesser distance than the diametrical distance between the peripheries of any diametrically disposed turbine blades of said turbine blade means, said turbine comprising a wall portion immediately adjacent the peripheries of said turbine blade means, the largest diameter of said immediately adjacent wall portion being greater than the axial length thereof, annular support means operatively connecting the individual stages of the compressor with corresponding stages of the turbine, means individually and rotatably supporting interconnected compressor-turbine stages on said stationary part, said arrangement further comprising the provision that the individually supported stages of said compressor are so arranged and constructed with the blade means thereof as to effectively constitute a supersonic compressor the blade means of the turbine and compressor of said last-mentioned stages being so arranged and constructed as to provide contra-rotation between adjacent individually supported stages, the combustion air passing through the compressor and the combustion gases passing through the turbine flowing in essentially mutually opposite directions.

5. A gas turbine drive unit according to claim 4, further comprising a runner of the end stage connected with said output shaft and carrying the last turbine section and the corresponding compressor stage being constructed as rotary input guide means for the compressor stages.

6. A gas turbine drive unit according to claim 4, wherein the end stage of said turbine connected with said output shaft carries the first turbine section and wherein the corresponding compressor stage is constructed as output guide means.

7. A gas turbine according to claim 3, wherein said stationary part is comprised by a stationary shaft, means for supporting said shaft including stationary portions intermediate said compressor-turbine stages and engaging said shaft.

References Cited by the Examiner

UNITED STATES PATENTS

| | | | |
|---|---|---|---|
| 824,449 | 6/06 | Stuart | 253—71 |
| 956,124 | 4/10 | Melville | 253—71 |
| 2,423,183 | 7/47 | Forsyth | 60—35.6 |
| 2,426,098 | 8/47 | Heppner | 60—39.16 X |
| 2,428,330 | 9/47 | Heppner | 60—35.6 |
| 2,429,681 | 10/47 | Griffith | 230—116 |
| 2,430,398 | 11/47 | Heppner | 60—35.6 |
| 2,441,488 | 5/48 | Howell | 60—35.6 |
| 2,505,660 | 4/50 | Baumann | 60—35.6 |
| 2,519,130 | 8/50 | Griffith | 60—35.6 |
| 2,543,864 | 3/51 | Melenric | 60—35.6 |
| 2,548,975 | 4/51 | Hawthorne | 60—35.6 |
| 2,639,583 | 5/53 | Steele | 60—39.16 |
| 2,659,528 | 11/53 | Price | 60—39.16 |
| 2,961,150 | 11/60 | Pirtle | 230—122 |
| 2,989,843 | 6/61 | Ferri | 60—35.60 |

FOREIGN PATENTS

| | | |
|---|---|---|
| 833,879 | 3/52 | Germany. |
| 577,017 | 5/46 | Great Britain. |
| 585,331 | 2/47 | Great Britain. |
| 553,509 | 12/56 | Italy. |

SAMUEL LEVINE, *Primary Examiner.*

JULIUS E. WEST, ABRAM BLUM, *Examiners.*